United States Patent Office 2,743,496
Patented May 1, 1956

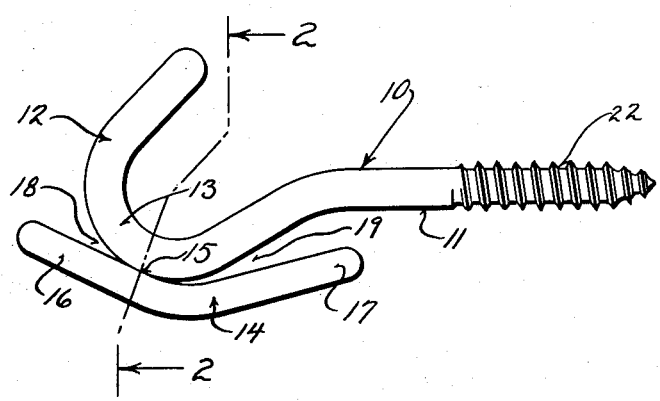
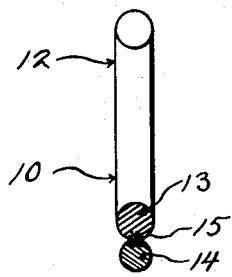
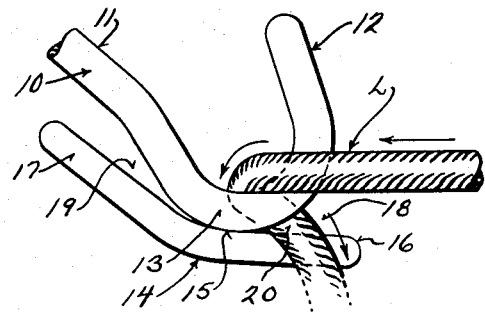
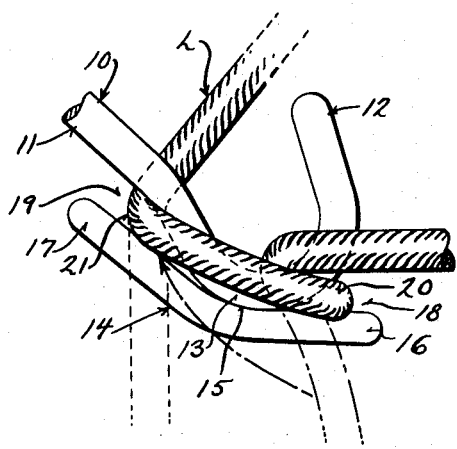
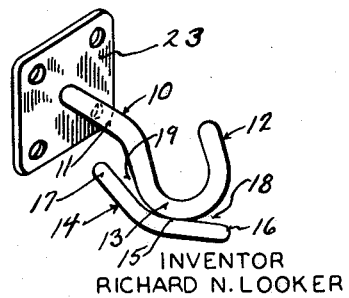
INVENTOR
RICHARD N. LOOKER

2,743,496

SELF-LOCKING ROPE HOOK

Richard N. Looker, Milwaukee, Wis.

Application June 5, 1953, Serial No. 359,835

2 Claims. (Cl. 24—130)

This invention appertains to hooks and hitches for lines and ropes, such as clothes lines, and more particularly to a hook for effectively holding an intermediate portion of a line or rope or an end of a line or rope against slipping.

One of the primary objects of my invention is to provide a clothes or like line hook with means forming a direct part thereof, for effectively securing a rope thereto, the entire arrangement being such that the stronger the pull on the rope the tighter the rope will be held.

Another salient object of my invention is to provide a hook for a rope or line having a cleat secured to the body or bight portion thereof, the arms of the cleat being so disposed relative to the body or bight as to form narrowing throats in which the rope is wedged when pulled, to prevent slipping of the rope.

A further object of my invention is to provide a rope or line hook of the type embodying a shank, a bill and a connecting bight portion, with a bar bent intermediate its ends to form angularly extending arms with one of the arms welded to the lower surface of the bight portion, whereby the angularly extending arms diverge from the opposite sides of the bight to form wedge throats.

A still further object of my invention is to provide a rope or line hitch of the above character, which will be durable and efficient in use, one that will be simple and easy to manufacture and one which can be placed upon the market at a low cost.

With these and other objects in view, the invention consists in the novel construction, arrangement and formation of parts, as will be hereinafter more specifically described and claimed and illustrated in the accompanying drawing, in which drawing, Figure 1 is a side elevational view showing my improved hook and rope hitch.

Figure 2 is a transverse sectional view therethrough taken on the line 2—2 of Figure 1, looking in the direction of the arrows.

Figure 3 is a fragmentary side elevational view looking in the opposite direction from Figure 1, and showing the rope being drawn tight around the hook.

Figure 4 is a view similar to Figure 3, but showing the rope wedged in place against slipping.

Figure 5 is a perspective view showing the use of an attaching plate in lieu of a threaded shank, the view being on a smaller scale than Figures 1 to 4.

Referring to the drawing in detail, wherein similar reference characters designate corresponding parts throughout the several views, the letter 10 generally indicates my improved combination hook and rope hitch and the same includes a shank 11, the bill 12 and the connecting arcurate bight portion 13. In accordance with my invention, I utilize with the hook, a bar 14, which is so shaped and associated with the hook in such a manner as to form a cleat in conjunction therewith. This bar is bent intermediate its ends, preferably at its transverse center, and the bar is securely welded, as at 15, to the lower surface of the bight portion 13. The bending of the bar 14 defines angularly extending arms 16 and 17, and these arms are of equal length. However, as one of the arms (in this instance, arm 16) is welded to the bight portion, the remaining arm protrudes a greater distance rearwardly of the hook than the first arm. By having the arms of equal length, the bar can be welded in place very quickly and the workman does not have to weld a selected arm in place.

As is clearly shown in Figure 1, the arms 16 and 17 are at an obtuse angle relative to one another, and the arms diverge forwardly and rearwardly from the curved surface of the bight portion 13, and this defines narrowing front and rear wedge throats 18 and 19.

In use of my combination hook and hitch, the rope or line, indicated by the reference character L, is passed over the bill 12 of the hook and is drawn taut and is then passed under the bight portion and in the throat 18 (see Figure 3), as indicated by the reference character 20. As the rope is pulled back in the throat, the same is securely wedged in place and the rope or line can now be brought back alongside of the bight portion 13, and inserted in the throat 19 (see Figure 4), as indicated by the reference character 21. It can be seen that the stronger the pull on the rope or line, the tighter the rope or line will be wedged in the throat 19. By again referring to Figure 4, it can been seen that a pull on the rope or line in either direction will draw the rope snug into either the throat 18 or 19. The bar effectively holds the rope up snug against the hook and the rope or line, after being placed in the throat 19 can be brought toward another like adjacent hook as suggested in full lines in Figure 4, or if the hook is used for a rope end, such end can be merely dropped, as shown in dotted lines in Figure 4.

Great stress is laid on the formation of the bar and its novel association with the bight 13 of the hook, and by this particular construction a simple and inexpensive hitch is made.

The shank 10 of the hook can either be threaded, as shown in Figure 1 and indicated by the reference character 22 so that the hook can be threaded into a wall or other support, or the shank can be secured to a bracket plate 23 (see Figure 5). In this instance, the bracket plate 23 is then secured by screws to the desired support.

Changes in details may be made without departing from the spirit or the scope of my invention, but what I claim as new is:

1. A rope hitch for a clothes line comprising a threaded shank, a bill, an arcuate connecting bight portion forming with said bill and shank a hook, a bar bent intermediate its ends defining angularly extending arms, said arms forming an obtuse angle with one another, and means rigidly securing one of said arms within the obtuse angle to the lower outer surface of said bight portion the arms lying substantially in the same plane as the hook, and said arms projecting in opposite direction from said bight portion and diverging angularly therefrom defining in conjunction with the outer arcuate face of the bight portion front and rear narrowing wedge throats.

2. A rope hitch for a clothes line comprising a shank, a bill, an arcuate connecting bight portion forming with said shank and bill a clothes line hook, a bar bent intermediate its ends defining angularly extending arms and said arms forming an obtuse angle, and means rigidly securing one of said arms within the obtuse angle to the lower outer surface of said bight portion in such a manner that the arm projecting rearwardly from the bight being of a greater length than the arm projecting forwardly from the bight, the arms lying substantially in the same plane as the hook and said arms forming with the bight portion front and rear narrowing wedge throats.

References Cited in the file of this patent

UNITED STATES PATENTS

| | | |
|---|---|---|
| 281,260 | Garfield | July 17, 1883 |
| 1,411,850 | Kroona | Apr. 4, 1922 |
| 1,426,537 | Bauer | Aug. 22, 1922 |
| 1,482,303 | Hird | Jan. 29, 1924 |
| 2,214,499 | Evans | Sept. 10, 1940 |
| 2,536,159 | Darkins | Jan. 2, 1951 |
| 2,642,640 | Mills | June 23, 1953 |